(12) United States Patent
Niederhageboeck

(10) Patent No.: US 7,445,413 B2
(45) Date of Patent: Nov. 4, 2008

(54) SCREW-NUT ASSEMBLY INCLUDING AN INTEGRATED, IMMEDIATELY EFFECTIVE SECURING ARRANGEMENT FOR PREVENTING UNINTENTIONAL LOOSENING OF A SCREWED CONNECTION FORMED THEREBY

(75) Inventor: Guilherme Niederhageboeck, Munich (DE)

(73) Assignee: Wolfgang Weiss, Ottobrunn (DE)

( * ) Notice: Subject to any disclaimer, the term of this patent is extended or adjusted under 35 U.S.C. 154(b) by 37 days.

(21) Appl. No.: 10/514,081

(22) PCT Filed: May 16, 2003

(86) PCT No.: PCT/EP03/05199

§ 371 (c)(1),
(2), (4) Date: Jun. 8, 2005

(87) PCT Pub. No.: WO03/098058

PCT Pub. Date: Nov. 27, 2003

(65) Prior Publication Data

US 2006/0008339 A1    Jan. 12, 2006

(30) Foreign Application Priority Data

May 17, 2002 (DE) ................. 102 22 107

(51) Int. Cl.
*F16B 39/06* (2006.01)
*F16B 31/00* (2006.01)
*F16B 39/32* (2006.01)

(52) U.S. Cl. .................. 411/216; 411/7; 411/326; 411/327; 411/950

(58) Field of Classification Search ............. 411/216, 411/7, 326–327, 950–952, 978, 322, 221, 411/292, 321, 296–298

See application file for complete search history.

(56) References Cited

U.S. PATENT DOCUMENTS

| 246,127 | A | * | 8/1881 | Hampshier | 411/321 |
|---|---|---|---|---|---|
| 327,213 | A | * | 9/1885 | Williamson | 411/296 |
| 523,001 | A | * | 7/1894 | McMaster | 411/205 |
| 859,063 | A | * | 7/1907 | Henson | 411/322 |
| 959,222 | A | * | 5/1910 | Jacobs | 411/297 |
| 1,334,389 | A | | 3/1920 | Murray | |
| 1,386,259 | A | * | 8/1921 | Jourdan et al. | 411/298 |
| 2,685,812 | A | * | 8/1954 | Dmitroff | 411/7 |
| 3,404,716 | A | * | 10/1968 | Cosenza | 411/105 |

(Continued)

FOREIGN PATENT DOCUMENTS

DE    3319818 A1 * 12/1984

(Continued)

*Primary Examiner*—Victor Batson
*Assistant Examiner*—David C Reese
(74) *Attorney, Agent, or Firm*—Townsend and Townsend and Crew, LLP

(57) ABSTRACT

A screw-nut assembly has an integrated immediately effective securing arrangement that prevents an unintentional loosening of a screw connection formed therewith. The screw-nut assembly has a first screw connection body and an associated second screw connection body. One of the two screw connection bodies (1) has a free-wheel (3) that is connected thereto in a rotationally fixed manner. A coupling device (9) is provided between the free-wheel (3) and the other of the two screw connection bodies (2). This coupling device connects both screw connection bodies to one another in a rotationally fixed manner and allows their disengagement from one another.

16 Claims, 15 Drawing Sheets

U.S. PATENT DOCUMENTS

| | | | |
|---|---|---|---|
| 3,554,340 A * | 1/1971 | Shimano et al. | 192/64 |
| 3,640,140 A * | 2/1972 | Gulick et al. | 74/89.38 |
| 4,047,603 A * | 9/1977 | Ozaki | 192/64 |
| 4,503,338 A * | 3/1985 | Mazzorana | 290/38 R |
| 4,512,697 A * | 4/1985 | Cascini | 411/7 |
| 4,555,197 A * | 11/1985 | Erickson | 403/1 |
| 4,609,314 A * | 9/1986 | Metz | 411/7 |
| 4,610,558 A * | 9/1986 | Erickson | 403/1 |
| 4,729,260 A * | 3/1988 | Dudden | 475/125 |
| 4,997,069 A * | 3/1991 | Strache | 477/7 |
| 5,188,398 A * | 2/1993 | Parimore et al. | 285/39 |
| 5,461,935 A * | 10/1995 | Hill | 74/89.38 |
| 5,713,708 A * | 2/1998 | Van derDrift et al. | 411/208 |
| 5,865,582 A * | 2/1999 | Ellis et al. | 411/353 |
| 6,010,289 A * | 1/2000 | DiStasio et al. | 411/174 |
| 6,082,941 A * | 7/2000 | Dupont et al. | 411/7 |
| 6,379,076 B1 * | 4/2002 | Reinhold et al. | 403/348 |
| 6,682,284 B2 * | 1/2004 | Chen | 411/432 |
| 2003/0049092 A1* | 3/2003 | Winker | 411/7 |

FOREIGN PATENT DOCUMENTS

| | | |
|---|---|---|
| DE | 3844169 A1 | 7/1990 |
| DE | 19837129 A1 * | 3/2000 |
| DE | 10222107 B3 | 1/2004 |

* cited by examiner

SCREW-NUT ASSEMBLY INCLUDING AN INTEGRATED, IMMEDIATELY EFFECTIVE SECURING ARRANGEMENT FOR PREVENTING UNINTENTIONAL LOOSENING OF A SCREWED CONNECTION FORMED THEREBY

BACKGROUND OF THE INVENTION

The invention relates to a screw-nut assembly including an integrated, immediately effective securing arrangement for preventing unintentional loosening of a screwed connection formed thereby, the assembly comprising a first screw connection body and an associated second screw connection body. The expression "screw-nut assembly" as used in this application is to be understood as one comprising any type of screwed connection wherein there is a mating of external and internal threads.

Locking washers are usually used for securing screw-nut connections, such washers being arranged below the nut when the screw or the nut is applied so that the effects produced by spring tension or frictional force prevent the assembly from loosening itself.

Furthermore, it is known to secure nuts by using additional positive-locking means which co-operate with the screw or another part fixed to the screw such as split pins, securing wires or the like for example. Here too, an additional element for securing the screw must be attached when mounting the screw and this element must be removed before it can be undone. Thus, these aforementioned techniques do not incorporate an integrated securing arrangement for the screw-nut connection.

Moreover, self-locking nuts and screws are known which incorporate an integrated securing element with the aid of which an immediate securing effect for preventing the assembly from loosening is obtained by virtue of the frictional engagement at the flanks of the threads. However, the disadvantage here is that the increased, loosening-inhibiting friction is also effective during the tightening process so that screw-operating tools must be used even during the pre-assembly process.

In the case of securing arrangements for singular screw-nut connections which enable the screw-nut connection to be rotated until the onset of the securing effect, the biasing force within the screw-nut connection can, in dependence on the type of screw securing arrangement, be reduced to zero until the screw securing arrangement becomes effective. Because there is then a lack of biasing force, the parts being screwed together by means of the screw-nut connection can undergo relative movements when forces are applied to these parts. For their part, these relative movements exert large forces on the screw-nut connection which can lead to the destruction of the screw-nut connection or that of its securing device. Such kinds of destruction have already occurred in the case of the wheels having a central quick-release mechanism which are used in motor sports for example.

In the automobile field, it has been known for a long time that unintentional opening of the wheel nuts, and especially the release of a so-called central quick-release mechanism, can be prevented by means of mechanically effective integrated aids. Thus, for example, DE 249 305 discloses a central quick-release mechanism for a vehicle wheel wherein a wheel nut is provided with an internally toothed ring-shaped collar at the front end thereof as seen in the direction of tightening. These internal teeth co-operate with external teeth on a bushing which is arranged on the wheel hub and is non-rotatable relative to the wheel hub while being axially displaceable against spring action. When screwing the wheel nut onto the wheel hub by means of a special tool, axially parallel pins that are arranged in a displaceable manner in the nut are pressed forwardly in the direction of tightening by the tool and keep the bushing spaced from the nut. It is only when the tool is removed that the bushing is pressed towards the nut by spring action, whereupon the external teeth of the bushing engage in the internal teeth in the collar of the nut and this thus prevents further rotation in both directions of rotation. However, in this securing arrangement, it is necessary for the nut to be located at the correct angle relative to the bushing in order to enable the teeth to engage with one another. Consequently, this nut securing arrangement is not a step-less arrangement. If the nut has to be tightened using a given torque, then it is generally necessary for the nut to be rotated backwards or forwards through some angular degrees after it has been tightened correctly in order to enable the parts to latch together and thus secure the nut.

A step-less nut securing arrangement for a central quick-release arrangement for a vehicle wheel is known from DE 263 371. Here, the nut is provided with a brake lever in the region where the outer peripheral surface thereof comes into contact with the inner periphery of the wheel rim boring, the brake lever being pressed against the inner periphery of the rim boring by the action of a spring. The lever is mounted slightly eccentrically so that it becomes clamped to the inner peripheral surface when the nut is rotated in the opening direction. For the purposes of loosening the nut, the lever must be pivoted by an additional tool against the action of the spring in order to overcome the clamping effect. This device is complex and expensive to manufacture and is unwieldy in practice, and the reliable manipulation thereof is severely restricted.

SUMMARY OF THE INVENTION

An object of the present invention is to provide a screw-nut assembly including an integrated immediately effective securing arrangement for preventing unintentional loosening of a screwed connection formed thereby to ensure a reliable locking action which can be manipulated in a simple and rapid manner.

In accordance with the invention, this object is achieved in that one of the two screw connection bodies comprises a free-wheel mechanism connected thereto in mutually non-rotatable manner and in that a coupling arrangement is provided between the free-wheel mechanism and the other one of the two screw connection bodies in order to connect the two screw connection bodies together in mutually non-rotatable manner and to release them from one another.

The provision of the free-wheel mechanism as an anti-rotation means for preventing unintentional loosening of the screwed connection makes for a precise and step-less screw securing arrangement which is immediately and directly effective in any position of rotation.

A preferred embodiment is characterized in that at least the first screw connection body comprises an axial boring, in that the free-wheel mechanism is arranged in the axial boring of the first screw connection body and carries a driver member in the axial boring of the first screw connection body such that it is rotatable in the direction of rotation corresponding to the tightening of the screwed connection, in that the free-wheel mechanism blocks movement in the direction of rotation corresponding to a loosening of the screwed connection, in that the second screw connection body comprises first coupling means which co-operate with second coupling means on the driver member, in that the first coupling means and the second coupling means are formed in such a manner that they automatically engage with one another when the screw connection bodies are being tightened and create a mutually non-rotatable connection between the second screw connection body and the driver member, and in that an uncoupling device is provided in order to uncouple the coupling means from one another for the purpose of loosening the screwed connection.

Due to the automatic coupling of the driver member to the second screw connection body which is screwed to the first screw connection body and by the provision of the free-wheel mechanism which is effective to block the screw-nut assembly in the direction of opening of the screw-nut assembly after the coupling process has occurred, there is ensured a reliable, effective, continuous and step-less securement of the tightened screw-nut assembly in that a relative rotation between the screw and the nut in the direction of opening is reliably prevented.

An alternative form of embodiment is characterized in that the first and the second screw connection bodies comprise a respective axial boring, in that the free-wheel mechanism is arranged in the axial boring of the second screw connection body, in that a driver member is inserted into the axial boring of the first screw connection body in mutually non-rotatable manner, in that the free-wheel mechanism carries first coupling means which co-operate with second coupling means on the driver member and which are adapted to rotate in the direction of rotation corresponding to the tightening of the screwed connection, in that the free-wheel mechanism blocks movement in the direction of rotation corresponding to a loosening of the screwed connection, in that the first coupling means and the second coupling means are formed in such a manner that they automatically engage with one another when tightening the screw connection bodies and create a mutually non-rotatable connection between the second screw connection body and the driver member, and in that an uncoupling device is provided in order to uncouple the coupling means from one another for the purpose of loosening the screwed connection.

This embodiment is of very compact construction and is also suitable for screwed connections of smaller thread diameters.

Preferably, the free-wheel mechanism comprises a cage containing rollers which co-operate with ramp-like blocking surfaces in a bearing ring. Hereby, the bearing ring may be located either radially within or radially externally of the cage containing the rollers.

As an alternative thereto, the free-wheel mechanism comprises a cage containing rollers which co-operate with ramp-like blocking surfaces on the outer periphery of a sleeve that is inserted into the cage provided with the rollers.

In another alternative embodiment, the free-wheel mechanism comprises a cage containing rollers which co-operate with ramp-like blocking surfaces on the inner periphery of the axial boring accommodating the cage provided with the rollers.

In an advantageous further development, the driver member is accommodated in the axial boring in axially displaceable manner. A mechanically simple and reliable coupling and uncoupling of the two coupling means is thereby made possible.

It is particularly advantageous if the driver member is biased by a springy element in the direction of that axial end of the first screw connection body from which the second screw connection body is screwed onto the first screw connection body. The automatic interengagement of the coupling means is thereby assisted in a particularly advantageous manner.

In a preferred advantageous further development of the invention, the first or the second coupling means are formed by studs and the corresponding counter-coupling means (the second coupling means and the first coupling means respectively) are formed by associated stud seatings. Such a design of the coupling means enables the second screw connection body to be coupled to the driver member in a secure and reliable manner and is also capable of transferring high torques in a secure and reliable manner.

It is particularly advantageous if the respective longitudinal axes of the studs and the stud seatings extend in parallel with the axial direction. This embodiment is particularly space-saving so that the screw-nut assembly in accordance with the invention can also be implemented with smaller screw diameters.

In a particularly advantageous embodiment, the stud seatings are formed in an end face of the driver member and the studs project out from a corresponding radial surface of the second screw connection body.

Alternatively, the stud seatings can be formed in a radial surface of the second screw connection body and the studs project out from the end face of the driver member.

It is particularly advantageous if the studs and the stud seatings are arranged in the form of a circle, if the neighboring stud seatings overlap one another so that the stud seatings are connected together in the manner of an annular groove and if the free ends of the respective studs are tapered. These embodiments wherein the width of the annular groove as measured in the radial direction varies, provide for fast and reliable engagement of the studs in the stud seatings since the tapered ends of the respective studs are reliably guided during the tightening process into the next stud seating where they produce a form-fit therewith so that the screwed-on second screw connection body moves the driver member in the direction of rotation in a reliable manner as from this very moment.

Advantageously, the second screw connection body comprises an opening, preferably a central axial opening through which the driver member is operable for axial displacement. The driver member can be displaced in the axial direction through this opening for the purpose of loosening the second screw connection body so that the coupling means disengage and the second screw connection body is freely rotatable in the direction required for opening the tightened connection.

Preferably, the first screw connection body comprising the driver member is provided with an external thread and the second screw connection body is in the form of a nut having an internal thread. This embodiment is particularly suitable for screwed connections having a large-diameter thread such as in central quick-release mechanisms for vehicle wheels for example. However, an inverse arrangement of the parts is also possible, whereby the driver member is then arranged in the nut into which there is then screwed a screw provided with coupling means on the free end face thereof. The screw may comprise an axial or axially parallel boring through which the driver member is then operable for axial displacement.

A preferred use of the screw-nut assembly in accordance with the invention is that of a central quick-release mechanism for a vehicle wheel.

Although, in principle, the screw-nut assembly in accordance with the invention could also be opened with a conventional tool when the coupling means are uncoupled from one another, it is advantageous if this is accomplished with the aid of a specially adapted screw-operating tool.

This object is achieved by means of a screw-operating tool for producing and loosening a screwed connection including a screw-nut assembly of the type in accordance with the invention, the tool having a profile which co-operates with a counter profile on one of the screw connection bodies for the purpose of producing a mutually non-rotatable coupling, wherein there is provided on the screw-operating tool an actuator which initially uncouples the first coupling means from the second coupling means during the process of loosening the screwed connection. This screw-operating tool enables the coupling connection to be released and the second screw connection body to be opened in a single working step.

Advantageously, the actuator displaces the driver member in the axial direction for uncoupling the coupling means from one another when loosening the screwed connection.

It is particularly advantageous if the screw-operating tool is designed as an adapter for a conventional screw-operating tool so that manipulation of the screw-nut assembly in accordance with the invention is also possible using a conventional tool which is merely provided with an adapter. In this way, it is ensured, in particular, that any existing mechanical screw-driving devices can continue to be used without additional expenditure on reequipping.

BRIEF DESCRIPTION OF THE DRAWINGS

The invention is explained in more detail hereinafter with the aid of an example taken with reference to the drawing. Therein:

FIG. 1 shows a first embodiment of the screw-nut assembly in accordance with the invention wherein the nut is partially screwed-on;

FIG. 6 shows a second embodiment of the screw-nut assembly in accordance with the invention wherein the nut is partially screwed-on;

FIG. 11 is a longitudinal sectional view of a third embodiment of the screw-nut assembly in accordance with the invention wherein the nut is partially screwed-on;

DESCRIPTION OF THE PREFERRED EMBODIMENTS

Figure 1:
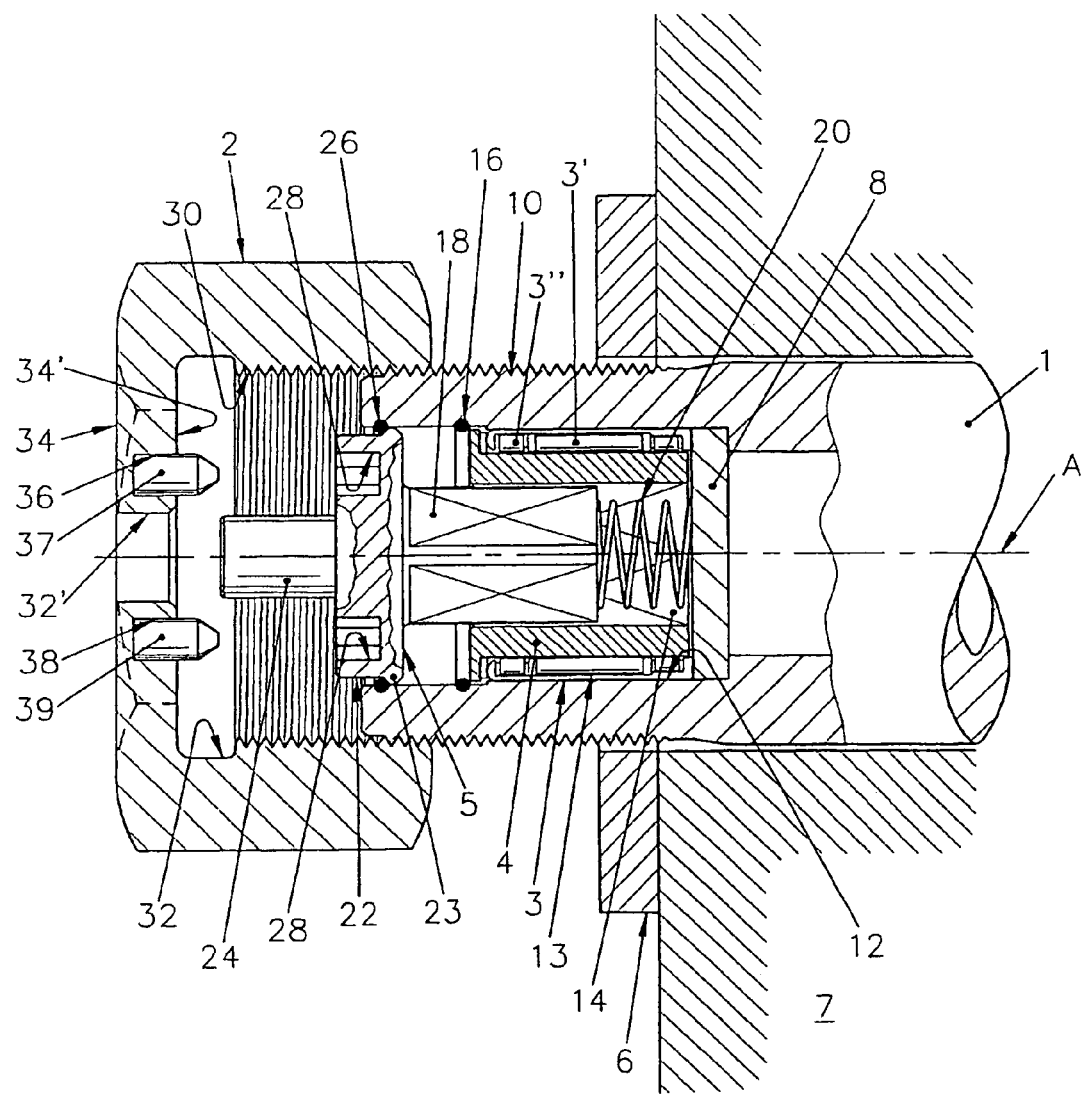

A first embodiment of the screw-nut assembly in accordance with the invention wherein the nut is partially screwed-on is shown in FIG. 1. A screw 1, which is provided with an external thread 10 at the free end thereof projecting from a boring in a workpiece 7, comprises a central axial boring 12 which is open towards the free end of the screw 1.

A free-wheel mechanism 3 is inserted into the axial boring 12 in such a way that an external bearing ring 13 of the free-wheel mechanism 3, which is in the form of a free-wheel bearing, is connected to the screw 1 in a mutually non-rotatable manner such as is known to the skilled person, for example, by means of a clamped coupling (with or without frictional engagement) or else by means of an interlocking connection. The free-wheel mechanism 3 comprises an external bearing ring 13 and also free-wheel rollers 3' and roller bearings 3" which are arranged therein. The free-wheel rollers 3' co-operate with blocking surfaces in the external bearing ring and run on an outer peripheral surface of a guide sleeve 4 inserted into the free-wheel mechanism 3. The free-wheel mechanism 3 permits the guide sleeve 4 to rotate about the axis A in a direction of rotation which corresponds to the tightening of the screw 1 and a nut 2 placed on the thread 10, and it blocks this screwed connection in the opening direction thereof. The exact functioning of a free-wheel mechanism will be described hereinafter in connection with FIG. 13.

Figure 4:
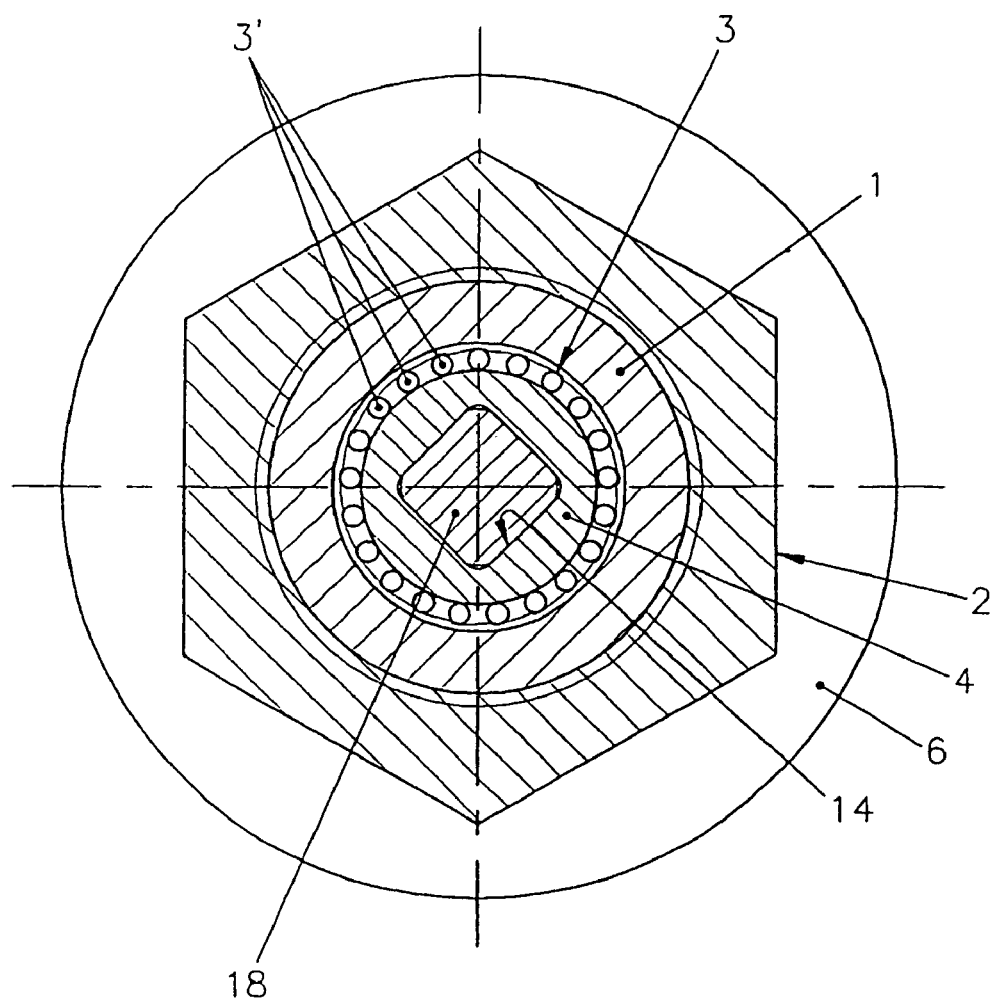
FIG. 4 is a sectional view of the first embodiment along the line IV-IV in FIG. 2.

The guide sleeve 4 is provided with an axial seating opening 14 having an essentially square cross-section, as is perceptible in FIG. 4. Rather than a square cross-section, any other polygonal cross-section or any other mutually non-rotatable, but axially displaceable (in the direction of the axis A) connection could also be provided.

The axial seating opening 14 extends through the entire length of the guide sleeve 4. The axial end of the guide sleeve 4 that points towards the interior of the screw rests on a base plate 8 which is inserted into the central axial boring 12 of the screw 1 and is supported in the axial direction on a radial shoulder surface of the stepped boring 12. At the end thereof facing the free end of the screw 1, the guide sleeve 4 is prevented from displacement in the axial direction by means of a snap ring 16 which is inserted into a circumferential groove formed in the inner periphery of the boring 12. The axial spacing between the base plate 8 and the snap ring 16 is, however, slightly greater than the axial length of the guide sleeve 4 so that the rotatability thereof about the longitudinal axis A is not impeded.

A subsequently described driver member 5, which comprises a square spigot 18 projecting in the axial direction, is inserted in tight-fitting but axially displaceable manner into the axial square-shaped seating opening 14. In the seating opening 14, there is provided an axially effective compression spring 20 which is supported on the one hand against the base plate 8 and against the free end face of the square spigot 18 on the other.

The driver member 5 comprises a middle disk-shaped section 22 which is adjoined on the side thereof pointing into the boring 12 in the axial direction by the square spigot 18, and is adjoined by a cylindrical actuating spigot 24 on the side thereof remote from the square spigot 18 in the axial direction. The outer periphery of the middle disk-shaped section 22 is provided with a ring-like projection 23 which is accommodated in the central axial boring 12 and forms a circumferential stop shoulder with the aid of which the middle disk-shaped section 22 of the driver member 5 rests against a snap ring 26, this ring being accommodated in a circumferential groove formed in the inner periphery of the central axial boring 12 in the vicinity of the free end of the screw 1, in such a manner that the driver member 5 is prevented from emerging completely from the central axial boring 12.

Figure 3:
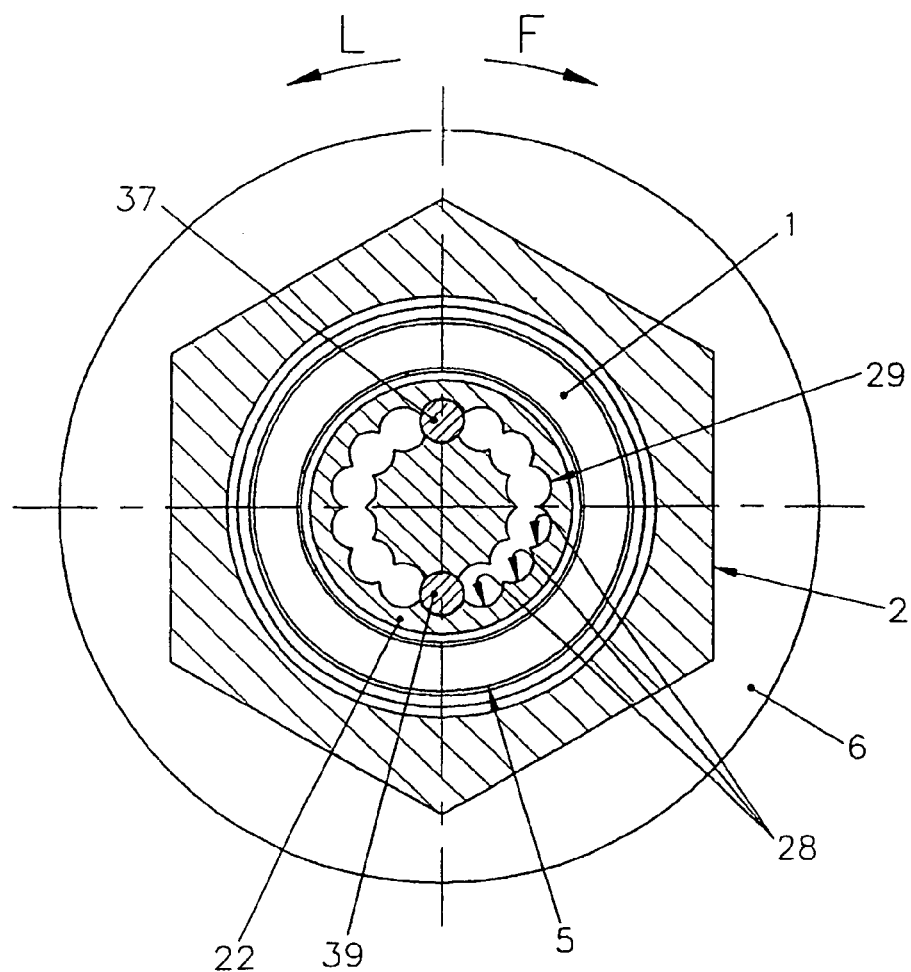
FIG. 3 is a sectional view of the first embodiment along the line III-III in FIG. 2.

As can be seen in FIG. 3, the middle disk-shaped section 22 of the driver member 5 is provided on the ring-shaped end face thereof that is remote from the square spigot 18 with a plurality of axially parallel borings 28 which are arranged in the form of a circle. The axially parallel borings 28 serve as stud seatings for studs provided in the nut 2 and, together therewith, form a coupling connection 9 as will be described hereinbelow.

As can also be perceived from FIG. 3, the borings 28 are arranged in the form of a circle in the middle disk-shaped section 22 of the driver member 5 in such a manner that neighboring ones of the axially parallel borings 28 penetrate into each other and mutually overlap so that they form a ring of borings 29. An annular groove-like formation is thus produced in this way, the width of the groove in the radial direction of the driver member 5 varying in accord with the contour of the borings 28 located adjacent to one another in the circular ring.

The nut 2, which is only partly screwed onto the screw 1 in FIG. 1, forms a second screw connection body provided with an internal thread 30, whereby the internal thread 30 is designed in such a manner that it co-operates with the external thread 10 of the screw 1 to form a screw connection. The internal thread 30 is provided in a diametrically stepped axial boring 32 of the nut 2 and it extends in the axial direction over only a frontal portion of the axial boring 32.

In the region thereof remote from the internal thread 30, the nut 2 is provided with an end wall 34 which is merely penetrated in the central portion thereof by a boring section 32' having a smaller diameter than that of the axial boring 32. The internal diameter of the boring section 32' is only slightly larger than the external diameter of the cylindrical actuating spigot 24 of the driver member 5 so that the actuating spigot 24 can be moved in friction-free manner in the axial direction within the boring section 32'.

In the internal end face 34' of the end wall 34 of the nut 2 pointing towards the internal thread 30, there are provided two seating borings 36, 38 in the form of blind borings which are diametrically opposite one another with respect to the longitudinal axis A and into which a respective stud 37, 39 is firmly inserted. The studs 37, 39 project out from the internal end face 34' of the end wall 34 in an axially parallel direction and are tapered at their respective free ends in the manner of a frustum of a cone.

The average spacing of the seating borings 36, 38 and thus of the studs 37, 39 corresponds to the average diameter of the annular groove-like ring of borings 29 formed by the axially parallel borings 28 so that the two mutually opposite studs 37, 39 can enter any two of the borings 28 which are located diametrically opposite to one another with respect to the longitudinal axis A.

Figure 2:
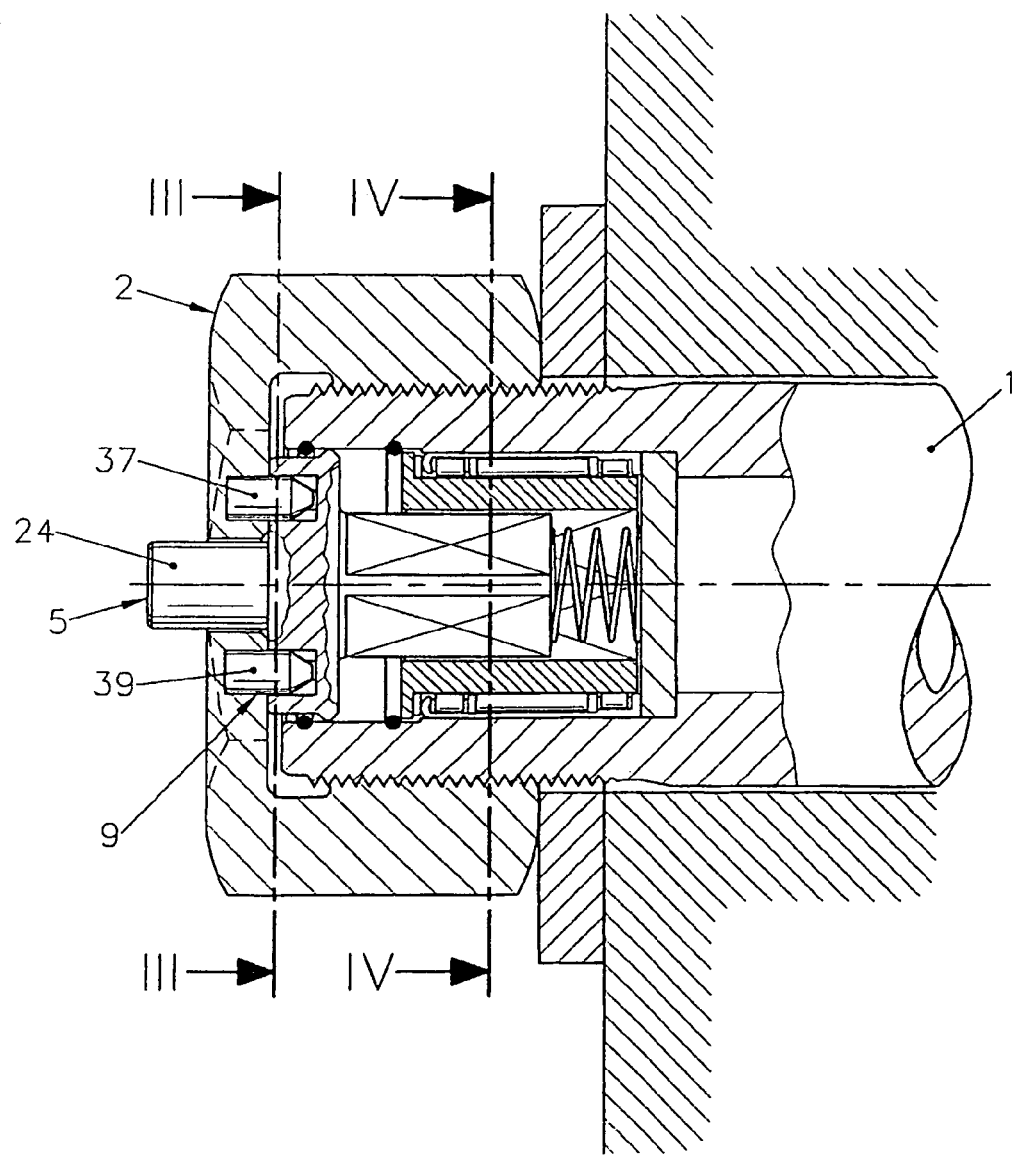
FIG. 2 shows the first embodiment wherein the nut is screwed-on completely.

The functioning of the screw-nut assembly in accordance with the invention will be explained hereinafter with reference to FIG. 2.

If, from the position illustrated in FIG. 1, the nut 2 is screwed onto the screw shank 1 in the clockwise direction (arrow F in FIG. 3) then the end face 34' of the end wall 34 of the nut 2 moves towards the free end of the screw 1 since the thread pair 10, 30 has a right-hand thread. Once the nut 2 has neared the screw 1 to such an extent that the respective frustum of a cone-shaped, tapered free end of the studs 37, 39 enters the ring of borings 29, then the studs 37, 38 come directly into engagement with two axially parallel diametrically opposite borings 28. As soon as this engagement process has been effected, the driver member 5 is also rotated in the clockwise direction by the rotation of the nut 2. Since the square stud 18 of the driver member 5 is accommodated in the axial square opening of the guide sleeve 4, the guide sleeve 4 is also rotated together with the nut 2 in the clockwise direction. The free-wheel mechanism 3 permits this rotation in the sense of a tightening of the screw-nut assembly. The freewheel mechanism 3 blocks movement in the anti-clockwise direction, i.e. in the direction of the arrow L in FIG. 3, so that loosening of the screw-nut assembly is not possible. The nut 2 is then screwed onto the screw 1 by the desired amount, an amount corresponding to a given torque for example, so that it reaches the position illustrated in FIG. 2 in which the nut 2 rests firmly against a washer 6 on the workpiece 7.

The release of the screw-nut assembly will be described hereinafter with the aid of FIG. 5.

Figure 5:
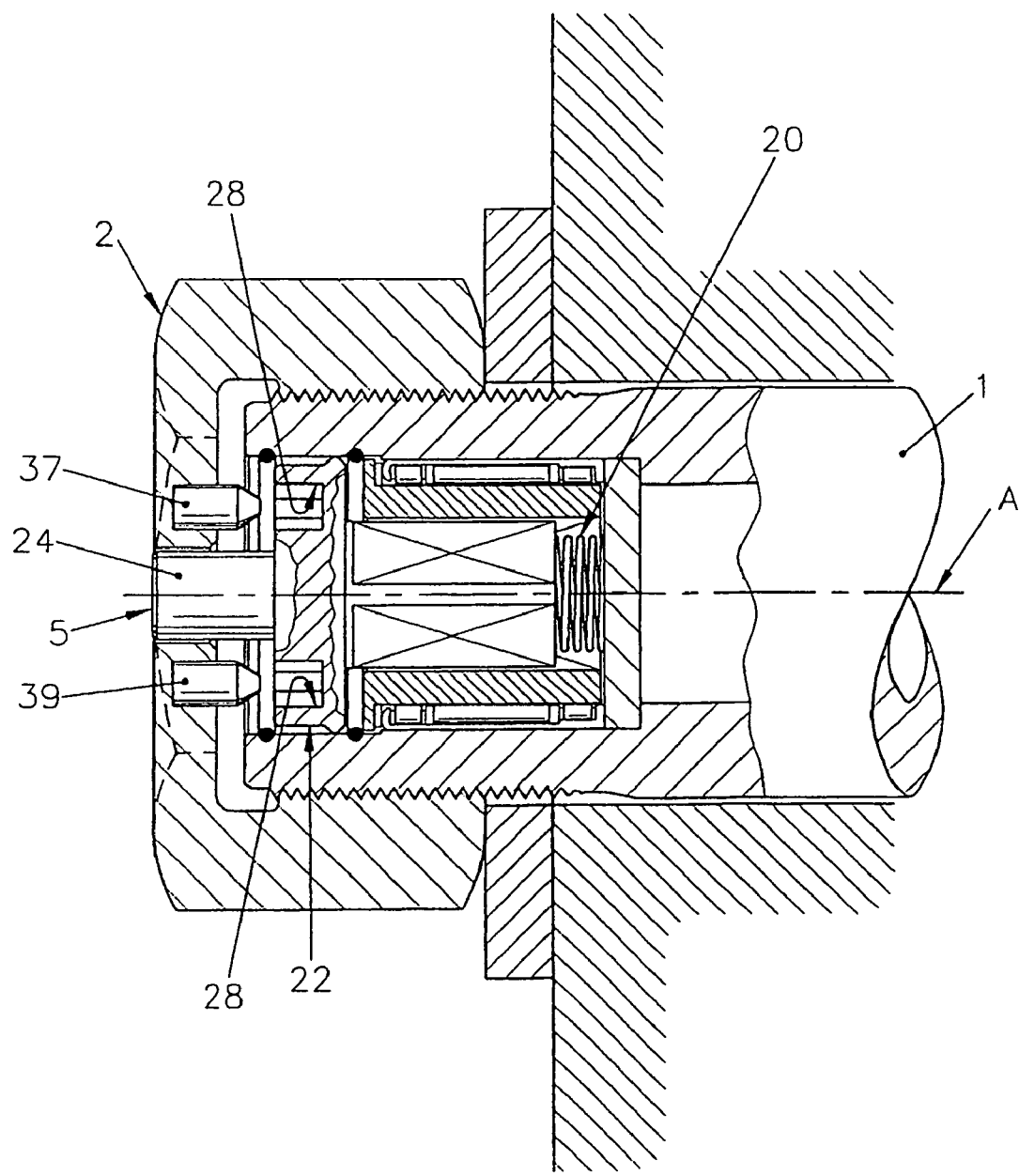
FIG. 5 is an illustration of the first embodiment in the unlocked state.

For the purpose of releasing the locked state of the screw-nut assembly, the cylindrical actuating spigot 24 of the driver member 5 is pressed inwardly against the force of the compression spring 20 in the direction of the axis A either manually or by means of a tool (to the right in FIG. 5). As a result of this action, the studs 37, 39 disengage from the axially parallel borings 28 in the middle disk-shaped section 22 of the driver member 5.

In the state shown in FIG. 5, the nut is unlocked and can be freely rotated in the anti-clockwise direction (direction L in FIG. 3), whereby the screw connection formed by the screw 1 and the nut 2 is loosened. Since the compression spring 20 always biases the driver member 5 in the direction of the nut 2 (to the left in FIG. 5), the studs 37, 39 immediately re-engage in two of the axially parallel borings 28 as soon as the pressure that was exerted manually or by the tool on the cylindrical actuating spigot 24 is no longer being applied. Consequently, loosening of the screw-nut assembly is only possible if the actuating spigot 24 and hence the driver member 5 is always consciously pressed inwardly during at least some revolutions of the nut 2 in the opening direction (to the right in FIG. 5). The strength of the compression spring 20 is such that accidental inward migration of the driver member 5, by vibratory action for example, is not possible.

A second exemplary embodiment will now be explained with the aid of FIGS. 6 to 10. In this example, the reference symbols are increased by the value 100 in relation to the first example of FIGS. 1 to 5 thereby enabling a comparison of the individual elements with those of the first exemplary embodiment to be made. Consequently, only the differences with respect to the first exemplary embodiment will be explained.

In place of the studs 37, 39, the inner periphery of the boring section 132' in the nut 102, which has a small diameter compared with that of the axial boring 132, is provided with a polygonal contour. This polygonal contour may, for example, be in the form of the internal teeth 132" of a multi-tooth profile such as can be perceived from the end view shown in FIG. 8. In correspondence therewith, the cylindrical actuating stud 124 of the driver member 105 is provided with a corresponding multi-tooth profile 124" consisting of external teeth on its matching polygon-shaped outer periphery. The free end of the polygon-shaped actuating spigot 124 is provided with a conical tapering section 124' which facilitates the engagement of the multi-tooth profile 132" on the inner periphery of the nut 102 with the multi-tooth profile 124" on the outer periphery of the driver member 105 that is guided in the boring 112 during the process of tightening the assembly into the locked position shown in FIG. 7.

Figure 6:
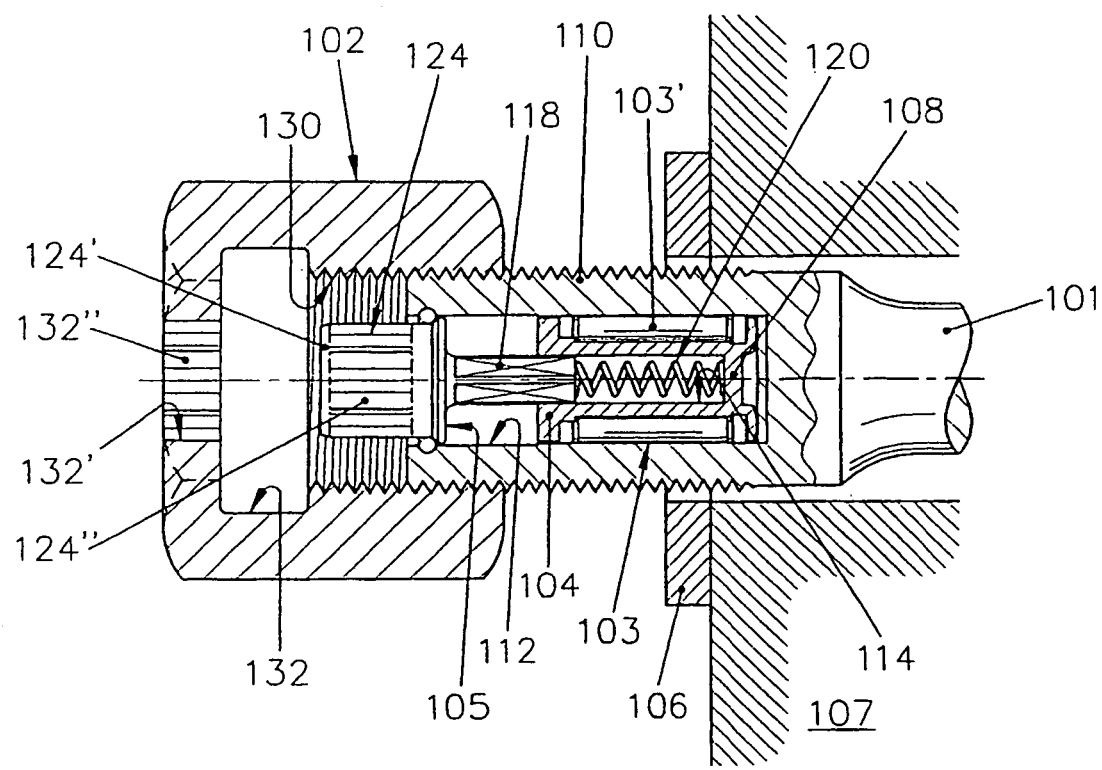

It can also be perceived from FIG. 6 that the guide sleeve 104 is modified as compared with the guide sleeve 4 of the first embodiment in that the axial opening 114 of the guide sleeve 104 is not continuous so that the guide sleeve 104 comprises a base 108 upon which the compression spring 120 is supported.

The screw-nut assembly of the second embodiment has a more compact construction than that of the first embodiment so that it can also be used with threads 110, 130 of smaller diameters.

Figure 7:
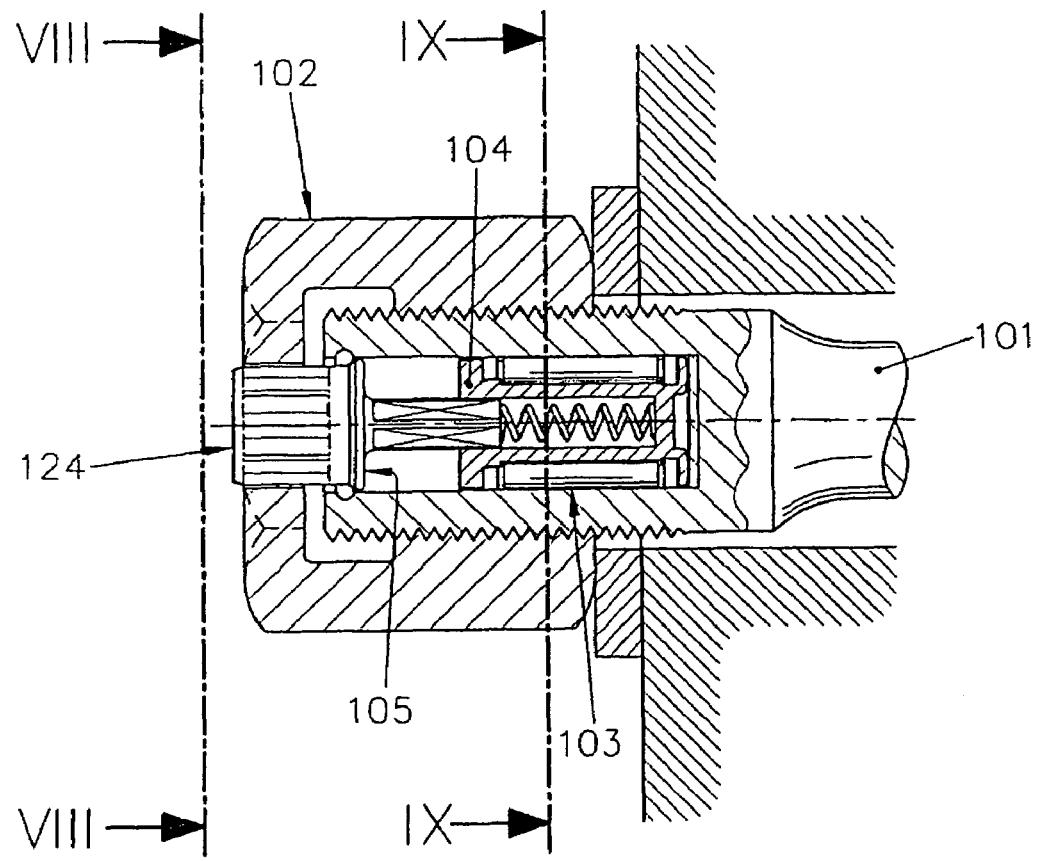
FIG. 7 shows the second embodiment wherein the nut is screwed-on completely.
Figure 8:
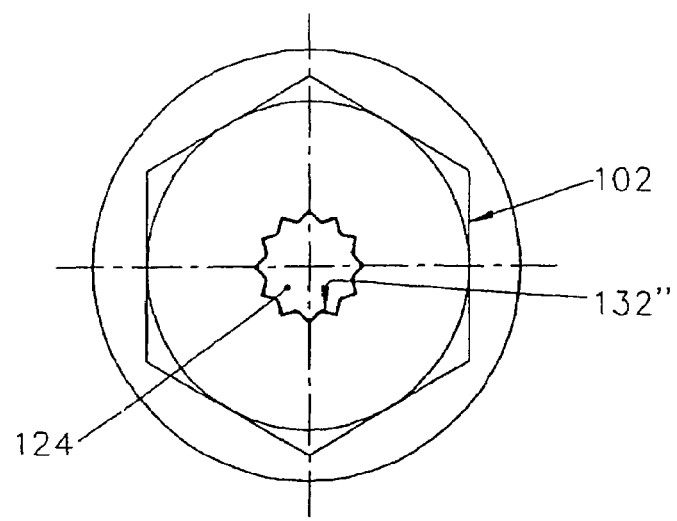
FIG. 8 shows an end view of the second embodiment in the direction of the arrows VIII-VIII in FIG. 6.

The illustration of FIG. 7 shows how the nut 102 and the driver member 105 are located in the mutually non-rotatable locked engagement position by means of the multi-tooth profiles 132" and 124". Since the mutually non-rotatable connection between the driver member 105, the guide sleeve 104 and the free-wheel mechanism 103 is in principle formed in the same way as in the first example, a reliable arrangement for preventing unintentional loosening of the screw-nut connection is also provided by the second embodiment.

Figure 9:
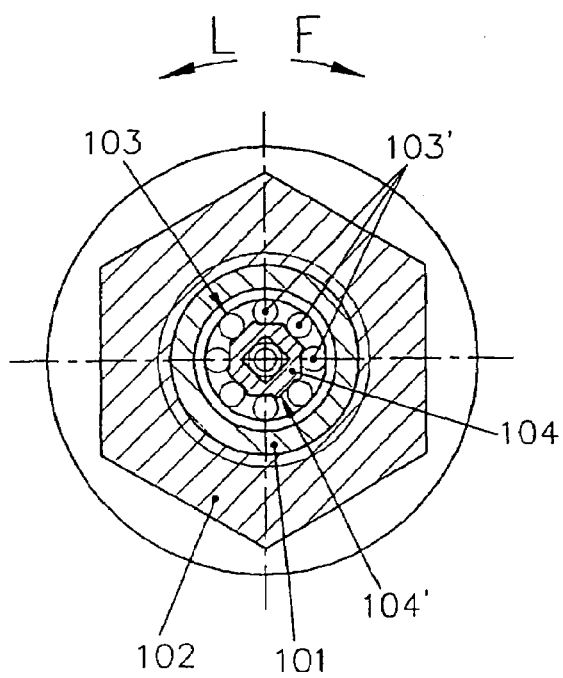
FIG. 9 is a sectional view along the line IX-IX in FIG. 6.

In contrast to the first embodiment, the free-wheel mechanism 103 is formed in such a way that the free-wheel rollers 103' co-operate with blocking surfaces 104' on an outer periphery of the guide sleeve 104 so as to provide a one-sided locking arrangement, as can be perceived from FIG. 9.

For the purposes of releasing the locking arrangement between the nut 102 and the screw 101, then, just as was described in connection with FIG. 5 for the first exemplary embodiment, the actuating spigot 124 is pressed sufficiently inwardly against the force of the spring 120, either manually or by means of a tool (to the right in FIG. 10), until such time as the multi-tooth profiles 132" and 124" disengage. The nut 102 can then be loosened in the opening direction L (in the anti-clockwise direction in the case of a right-hand thread).

A third exemplary embodiment will be explained hereinafter with reference to FIGS. 11 to 15. In the case of the third exemplary embodiment, the reference symbols are increased by the value 200 with respect to the first exemplary embodiment. Consequently, only the modifications of the third exemplary embodiment with respect to the first exemplary embodiment are described.

A substantial difference between the third embodiment and the first and second embodiments lies in the fact that the free-wheel mechanism 203 is not arranged in the screw 201, but rather in an axial boring 231 in the nut 202. In consequence, a still more compact construction of the screw-nut assembly can be realized so that the securing arrangement for preventing unintentional release in accordance with the invention can also be provided for threads 210, 230 having yet smaller diameters than those of the second embodiment.

In this third embodiment, the guide sleeve 204 is arranged in the end wall 234 of the nut 202 such that it is radially within the free-wheel rollers 203' of the free-wheel mechanism 203 and is prevented from displacement in the axial direction.

Figure 13:
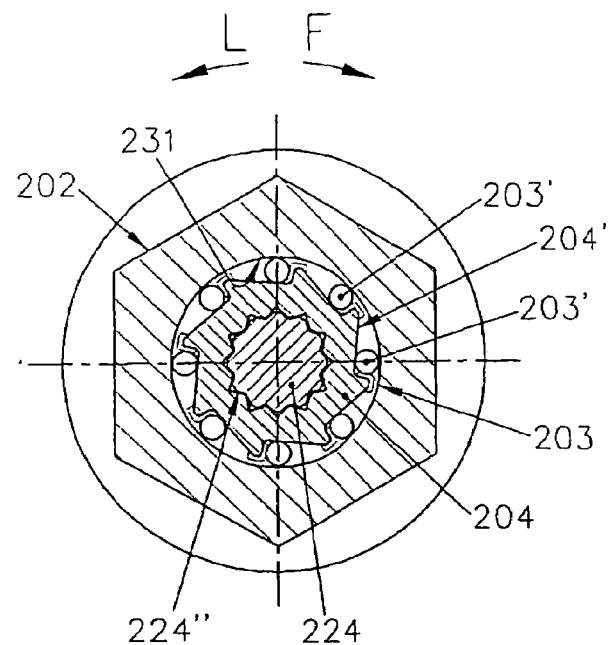
FIG. 13 is a sectional view along the line XIII-XIII in FIG. 10.
Figure 14:
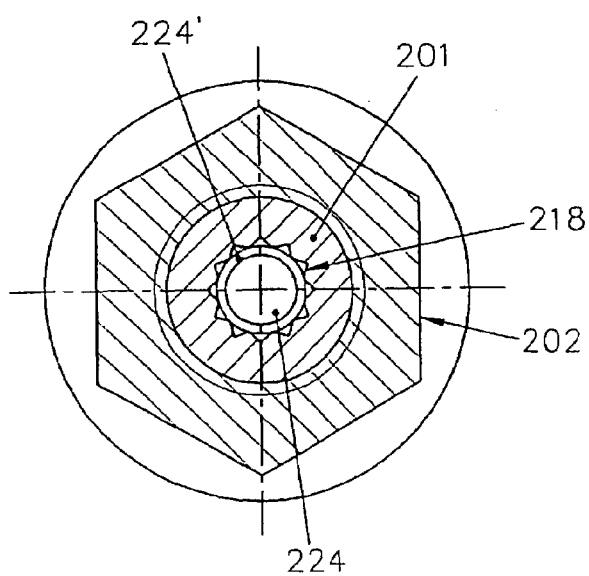
FIG. 14 is a sectional view along the line XIV-XIV in FIG. 10.

It can be perceived from the sectional view of FIG. 13 that the free-wheel rollers 203', which are arranged in a cage, co-operate with blocking surfaces 204' on the outer periphery of the guide sleeve 204 and thus form the free-wheel mechanism 203. When the nut 202 is rotated in the clockwise direction (the direction F in FIG. 13), the free-wheel rollers 203' are moved forward by the nut 202 by means of frictional action into a region where the radial spacing between the guide sleeve 204 and the wall of the boring 231 in the nut 202 that accommodates the cage containing the free-wheel rollers 203' is sufficiently large as to prevent the free-wheel rollers 203' from jamming between the nut 202 and the guide sleeve 204. For the purposes of increasing the reliability of the clamping action, and in particular to prevent loosening caused by vibrations, the individual free-wheel rollers 203' within the (not shown) cage may be biased by spring action in the locking direction (in the anti-clockwise direction in FIG. 13).

Should the nut 202 be rotated in the direction for opening the screw-nut assembly (the anti-clockwise direction L in FIG. 13), the free-wheel rollers 203' are moved by the nut 202 by means of frictional action in the anti-clockwise direction and roll into a region where the distance between the blocking surfaces 204' of the guide sleeve 204 and the inner peripheral surface of the axial boring 231 in the nut 202 is smaller than the diameter of the free-wheel rollers 203' so that the free-wheel rollers 203' are effective as blocking rollers and are clamped between the blocking surfaces 104' and the inner peripheral surface 231 and thus prevent rotation of the nut 202 in the direction L. The blocking action described above occurs if the guide sleeve 204 cannot rotate together with the nut 202 because the multi-tooth profile 224" on the actuating stud 224 of the driver member 205 which is of similar form to that in the second example is in engagement with a multi-tooth profile 204" on the inner peripheral surface of the guide sleeve 204, as can be perceived from FIG. 12.

In the third exemplary embodiment, the end section of the driver member 205 remote from the actuating spigot 224 is likewise provided with a polygonal profile, a multi-tooth profile 218 for example, which is in engagement with a corresponding polygonal or multi-tooth profile 213 on the inner peripheral surface of an axial boring 212 in the free end of the screw 201. The multi-tooth profiles 218 and 224' formed on the outer periphery of the driver member 205 are in the form of a continuous multi-tooth profile, the external diameter thereof merely being reduced in that portion of the multi-tooth profile 224" provided for engagement with the guide sleeve 204 as compared with the portion provided with the multi-tooth profile 218. Thus, the multi-tooth profile 218 has full teeth whereas the multi-tooth profile 224" comprises partial teeth, half teeth for example. This partial tooth design of the multi-tooth profile 224" can be perceived in the sectional view of FIG. 13. The advantage of this arrangement lies in the fact that after the multi-tooth profile 218 having the full teeth is inserted into the axial boring 212 of the screw 201 provided with the internal multi-tooth profile 213, an axial securing arrangement for preventing the driver member 205 from falling out of the axial boring 212 can be created by caulking the opening of the axial boring 212 to an opening diameter which is smaller than the external diameter of the multi-tooth profile 218 but is larger than the external diameter of the multi-tooth profile 224" comprising the partial teeth. This caulking can be perceived in FIG. 11 and is designated by the reference symbol 226.

In a manner similar to that of the first two examples, a compression spring 220 forces the driver member 205 to the left, i.e. towards the nut 202, whereby the driver member 205 is prevented from emerging from the boring 212 by the caulking 226 so that it is displaceable within the boring 212 in the direction of the axis A against the pressure of the spring 220. In this exemplary embodiment too, the actuating spigot 224 is provided at the free end thereof with a cone-shaped taper 224' which facilitates the entry of the multi-tooth profile 224" into the multi-tooth profile 204" of the guide sleeve 204.

Figure 15:
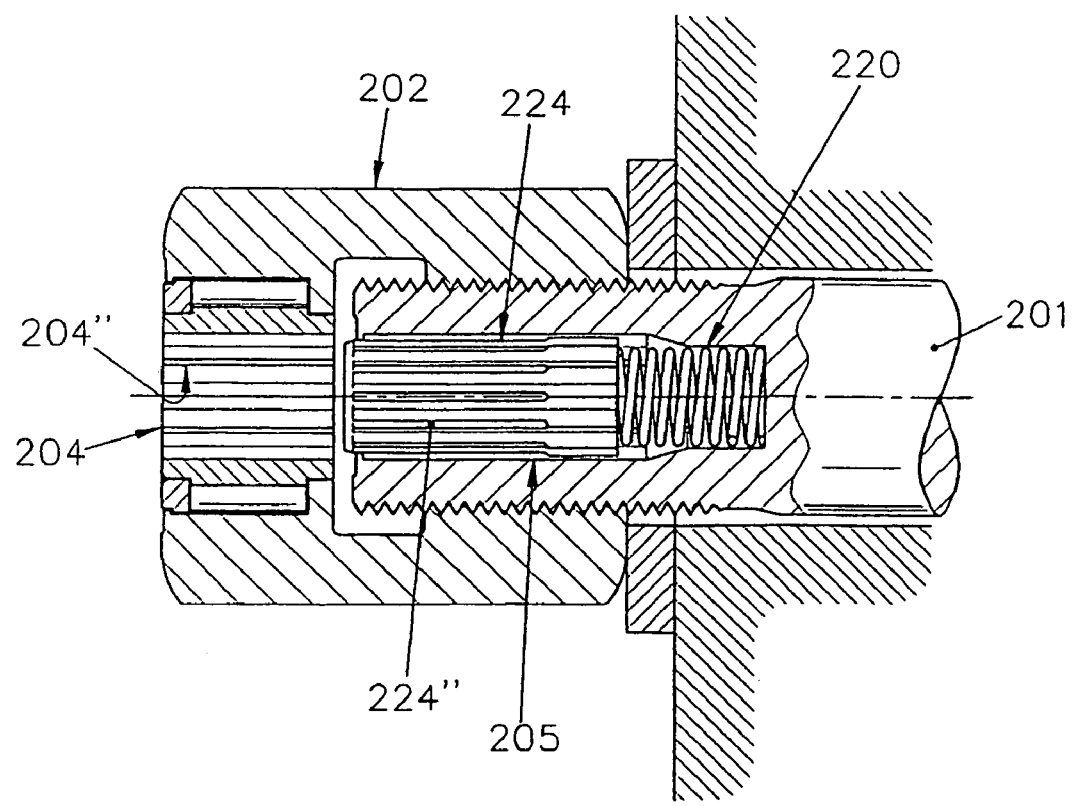
FIG. 15 is an illustration of the third embodiment in the unlocked state.

The unlocking position of the screw-nut assembly in accordance with the third embodiment is illustrated in FIG. 15. The actuating spigot 224 of the driver member 205 is pressed inwardly (to the right in FIG. 15) against the pressure of the compression spring 220, either manually or by means of a tool, to such an extent that the multi-tooth profile 224" of the actuating spigot 224 disengages from the multi-tooth profile 204" of the guide sleeve 204 provided in the nut 202. In consequence, the guide sleeve 204 can rotate together with the nut 202 when the nut 202 is rotated so that relative movement between the nut 202 and the guide sleeve 204 can no longer take place. Consequently, the blockade on the free-wheel rollers 203' by the blocking surfaces 204' is also lifted so that the nut 202 can also be rotated in the anti-clockwise direction (in the direction L in FIG. 13) whereby the screw-nut connection can be loosened again.

Figure 16:
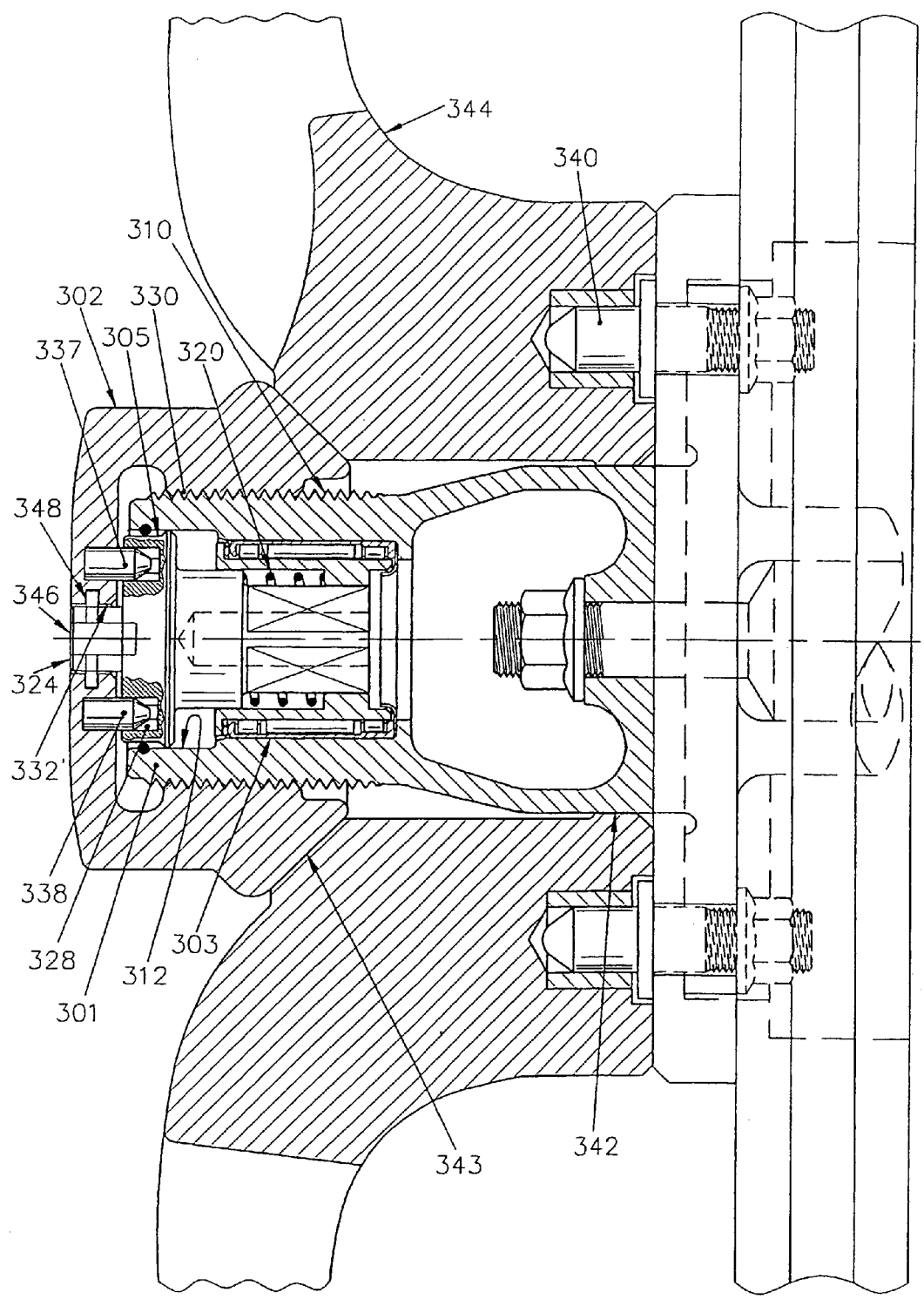
FIG. 16 shows an application of the first embodiment in the form of a central quick-release mechanism for a vehicle wheel and FIG. 17 shows a screw-operating tool for the screw-nut assembly in accordance with the invention.

FIG. 16 shows an application of a screw-nut assembly which is designed in accordance with the first exemplary embodiment shown in FIGS. 1 to 5 in the form of a central screw-fixing arrangement for the wheel of a vehicle. In this Figure, the reference symbols of the individual components in the first exemplary embodiment are increased by the value 300.

The screw 301 represents a central bearing journal which is provided with an external thread 310. Locating pins 340 are provided on the bearing journal and these engage in corresponding recesses in the hub of a wheel rim 344 in order to locate the latter on the bearing journal in mutually non-rotatable manner. The bearing journal is provided with supporting surfaces 342 for the wheel rim 344. The wheel nut 302 also comprises appropriate supporting surfaces 343.

The application of the screw-nut assembly in accordance with the present invention to a central wheel fixing arrangement provides an integrated, high-grade, secure and immediately effective securing arrangement for preventing unintentional release of the wheel and permits precise adjustment of the tightening torque for the wheel nut 302 which is provided with an internal thread 330. The procedure for tightening and loosening the wheel nut 302 corresponds to the procedure described in connection with the first exemplary embodiment, whereby here too the free-wheel mechanism 303 provided in the boring 312 of the screw 301 is effective to prevent rotation in the opening direction.

If a lock 346 is provided in the interior of the actuating spigot 324 and the lock comprises at least one locking element 348 which projects radially out from an opening in the actuating spigot 304 [sic] into a corresponding seating in the inner periphery of the boring section 332' when in the locked state as is schematically illustrated in FIG. 16, then a securing arrangement is provided in a simple manner for preventing the driver member 305 from being displaced in the axial direction. Thus, in the locked state of the lock 346, it is not possible for the actuating spigot 324 to be pressed inwardly against the pressure of the compression spring 320 in order then to disengage the studs 337 and 338 from the stud seatings 328 and thereby loosen the nut 302. Consequently, the lock 346 in the actuating spigot 324 forms an integrated securing arrangement for preventing theft of the wheel.

In each of the embodiments of the invention, the opening in the nut formed by the boring section 32', 132', 232', 323', through which the actuation of the associated driver members 5, 105, 205, 305 is effected for unlocking purposes, can be sealed. In consequence, it will be immediately apparent in the case of the screw-nut assembly being screwed together as to whether the screw-nut assembly has been undone and tightened up again without authorization, since the seal will be pierced and thereby destroyed by the actuation of the driver member.

Figure 17:
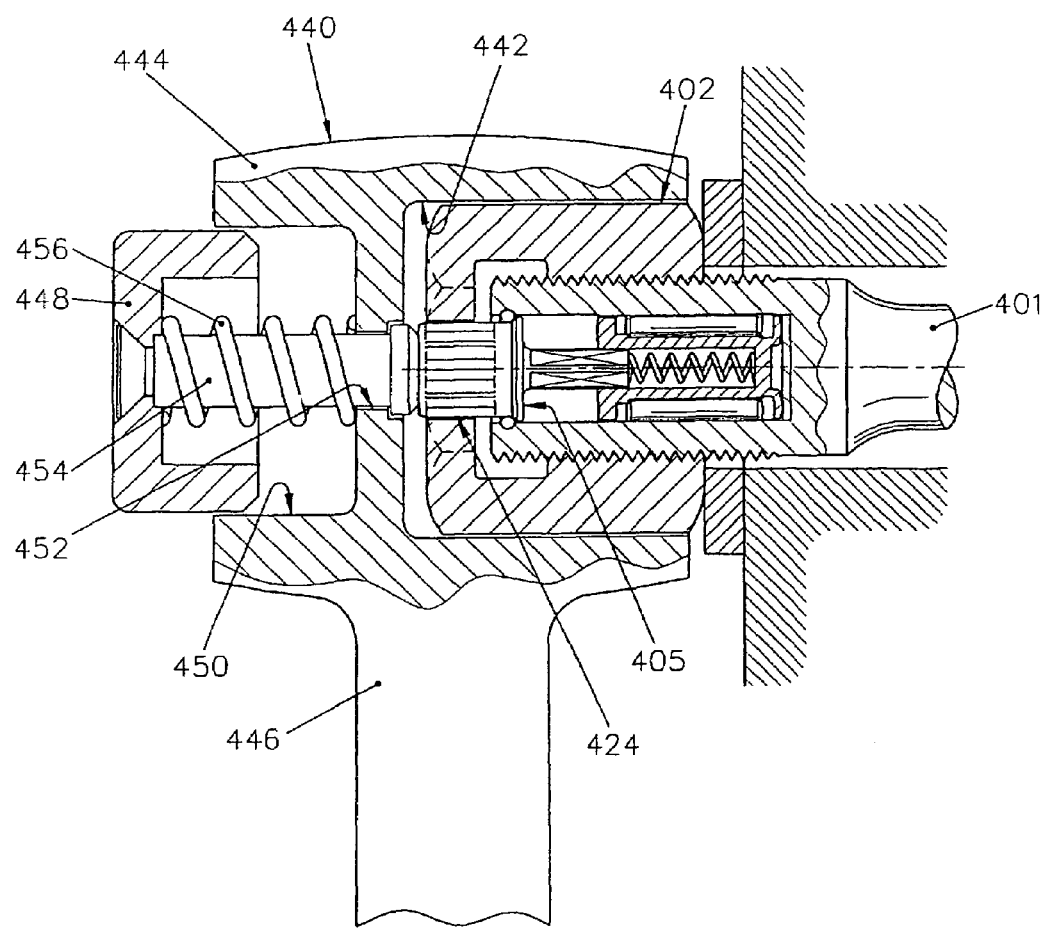

FIG. 17 provides a schematic view of a screw-operating tool 440 for tightening and especially releasing a screw-nut assembly in accordance with the invention. The screw-nut assembly illustrated in FIG. 17 corresponds to the second embodiment although the screw-operating tool 440 could also be formed in appropriate manner for the other embodiments.

The screw-operating tool 440 is placed upon the nut 402, whereby the outer periphery of the nut 402 and the nut-seating-opening 442 of the screw-operating tool 440 have a suitable polygonal profile, a conventional hexagonal profile for example. However, the nut could also be provided with an inner polygonal profile, a female hexagonal profile for example, whereby the screw-operating tool would then be provided with an appropriate external profile. The screw-operating tool 440 consists of a head section 444 and a lever section 446. In the head section 444 thereof, the screw-operating tool 440 is provided with a push button 448 which is accommodated in a seating recess 450 of the screw-operating tool 440. The seating recess 450 for the push button 448 and the seating opening 442 for the nut 402 are arranged coaxially and connected together by a central boring 452. The push button 448 is provided at the rear side thereof pointing towards the seating opening 442 with a release spigot 454 which is of cylindrical shape and extends through the central boring 452 into the seating opening 442 for the nut 402. A compression spring 456 is placed in the seating recess 450 for the push button 448 and surrounds the release spigot 454.

Figure 10:
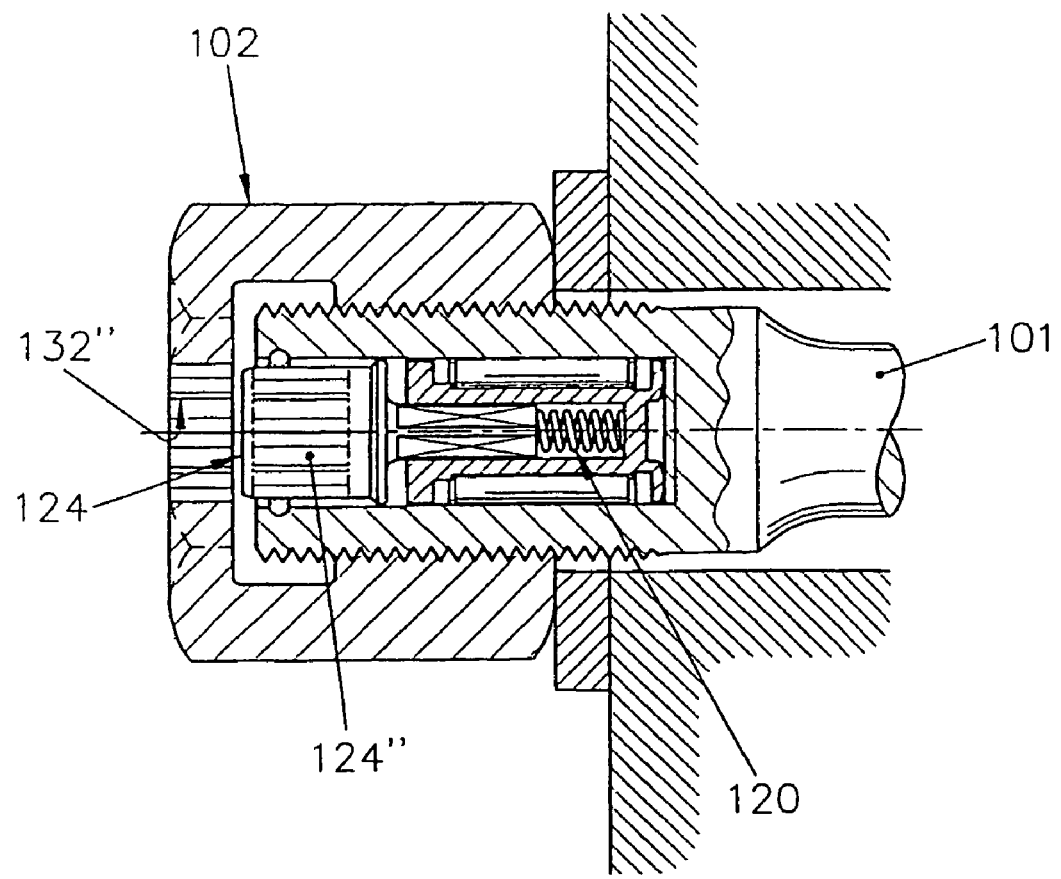
FIG. 10 is an illustration of the second embodiment in the unlocked state.
Figure 11:
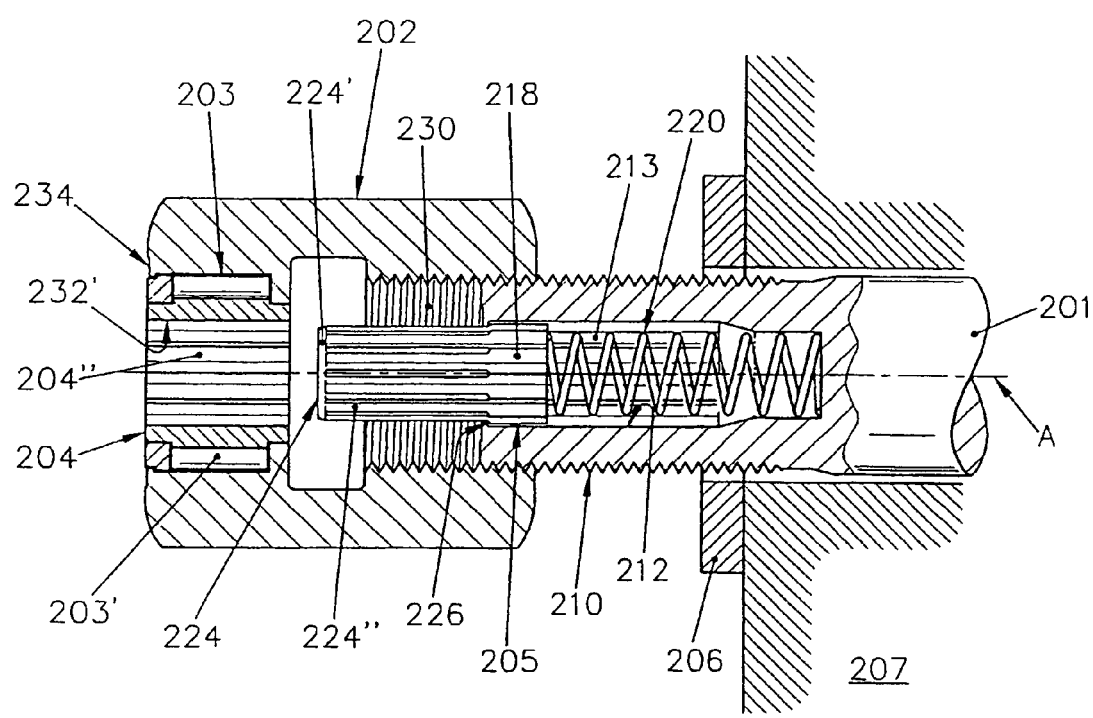
Figure 12:
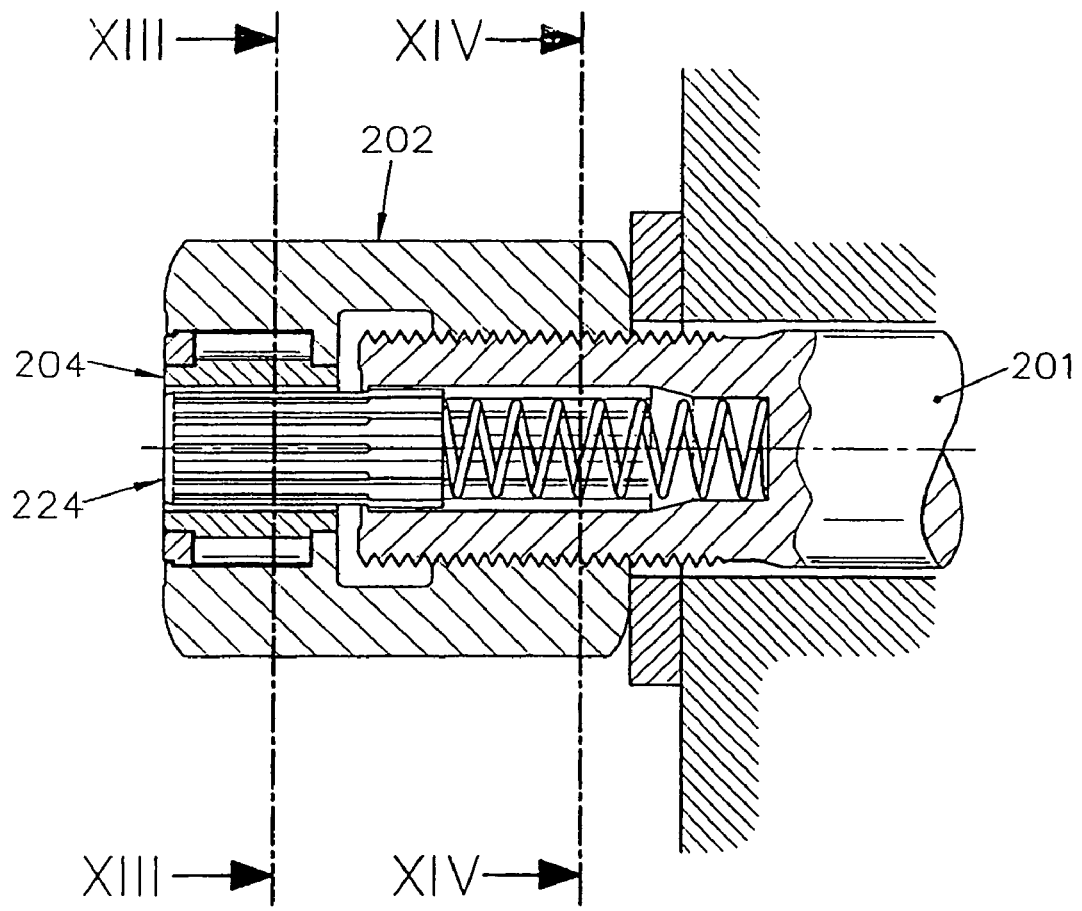
FIG. 12 is a longitudinal sectional view of the third embodiment wherein the nut is screwed-on completely.

If the push button 448 is pressed inwardly (to the right in FIG. 17), then the release spigot 454 comes into contact with the actuating stud 424 of the driver member 405 and, upon further depression of the actuating button 448, the actuating spigot 424 is pressed into the unlocking position shown in FIG. 10. The nut 402 can now be rotated by the tool 440 in the opening direction and released from the screw 401. In order to hold the actuating button 448 in the depressed position thereof required for unlocking the screw-nut assembly, there may be provided a (not shown) latching device for the actuating button 448.

In place of the manually operable screw-operating tool 440 shown in FIG. 17, a generally known automatic screw-operating tool could also be provided with an appropriate actuating device for unlocking the screw-nut assembly in accordance with the invention. As an alternative thereto, the screw-operating tool 440 could also be in the form of an adapter for conventional screw-operating tools.

Although the driver member is arranged in the first screw connection body (a screw) in the examples described, the driver member could likewise be arranged in the second screw connection body (a nut). Hereby, the actuation of the unlocking arrangement is effected through an axial opening in the first screw connection body.

Although just the screw-nut assembly in accordance with the invention alone provides a highly secure arrangement for preventing unintentional loosening of a screwed connection formed thereby, additional known mechanical nut-screw securing arrangements could also be provided if this should be demanded by the regulations relating to security for example.

The invention is not limited to the above exemplary embodiment which only serves for a general explanation of the core concept of the invention. Rather, it is within the general scope of protection that the device in accordance with the invention could also adopt different forms than those of the embodiments described above. In particular, the device may comprise features which represent a combination of the respective individual features disclosed herein.

The reference symbols, the description and the drawings serve only to provide a better understanding of the invention and are not intended to limit the scope of protection.

The invention claimed is:

1. A screw-nut assembly including an integrated, immediately effective securing arrangement for preventing unintentional loosening of a screwed connection formed thereby, comprising a first screw connection body and an associated second screw connection body,
wherein
one of the first and second screw connection bodies comprises a free-wheel mechanism connected thereto,
a releasable coupling arrangement is provided between the free-wheel mechanism and the other one of the first and second screw connection bodies,
the releasable coupling arrangement connects the free-wheel mechanism and the other one of the first and second screw connection bodies in a mutually non-rotatable manner when the coupling arrangement is in a blocked state and disconnects the free-wheel mechanism from the other one of the first and second screw connection bodies when the coupling arrangement is in a released state,
the free-wheel mechanism is provided in such a manner that the screw connection bodies are rotatable in a direction of rotation (F) corresponding to the tightening of the screwed connection, when the coupling arrangement is in the blocked state,
in the blocked state of the coupling arrangement the free-wheel mechanism blocks relative movement of the first and second screw connection bodies in a direction of rotation (L) corresponding to a loosening of the screwed connection, and
in the released state of the coupling arrangement relative movement in the direction of rotation (L) corresponding to a loosening of the screwed connection is allowed,
wherein
the coupling arrangement comprises first coupling means and second coupling means,
the first and the second screw connection bodies each comprise a respective axial boring,
the free-wheel mechanism is arranged in the axial boring of the second screw connection body,
a driver member is inserted into the axial boring of the first screw connection body in mutually non-rotatable manner,
the free-wheel mechanism carries said first coupling means which co-operate with said second coupling means on the driver member and which are adapted to rotate in the direction of rotation (F) corresponding to the tightening of the screwed connection,
the first coupling means and the second coupling means are formed in such a manner that they automatically engage with one another when tightening the screw connection bodies and create a mutually non-rotatable connection between the second screw connection body and the driver member, and
an uncoupling device is provided in order to uncouple the coupling means from one another for the purposes of loosening the screwed connection.

2. A screw-nut assembly in accordance with claim 1,
wherein said driver member is accommodated in said axial boring in an axially displaceable manner.

3. A screw-nut assembly in accordance with claim 2,
wherein said driver member is biased by a springy element in the direction of an axial end of the first screw connection body from which the second screw connection body is screwed onto the first screw connection body.

4. A screw-nut assembly in accordance with claim 1,
wherein the second screw connection body comprises an opening through which said driver member is operable for axial displacement.

5. A screw-nut assembly in accordance with claim 1,
wherein the first screw connection body comprising said driver member is provided with an external thread and in that the second screw connection body is formed with an internal thread acting as a nut.

6. A screw-nut assembly including an integrated, immediately effective securing arrangement for preventing unintentional loosening of a screwed connection formed thereby, comprising a first screw connection body and an associated second screw connection body,
wherein
one of the first and second screw connection bodies comprises a free-wheel mechanism connected thereto,
a releasable coupling arrangement is provided between the free-wheel mechanism and the other one of the first and second screw connection bodies,
the releasable coupling arrangement connects the free-wheel mechanism and the other one of the first and second screw connection bodies in a mutually non-rotatable manner when the coupling arrangement is in a blocked state and disconnects the free-wheel mechanism from the other one of the first and second screw connection bodies when the coupling arrangement is in a released state,
the free-wheel mechanism is provided in such a manner that the screw connection bodies are rotatable in a direction of rotation (F) corresponding to the tightening of the screwed connection, when the coupling arrangement is in the blocked state,
in the blocked state of the coupling arrangement the free-wheel mechanism blocks relative movement of the first and second screw connection bodies in a direction of rotation (L) corresponding to a loosening of the screwed connection, and
in the released state of the coupling arrangement relative movement in the direction of rotation (L) corresponding to a loosening of the screwed connection is allowed,
wherein the free-wheel mechanism comprises a cage containing rollers which interact with blocking ramp surfaces on the outer periphery of a sleeve that is inserted into the cage provided with the rollers.

7. A screw-nut assembly including an integrated, immediately effective securing arrangement for preventing unintentional loosening of a screwed connection formed thereby, comprising a first screw connection body and an associated second screw connection body,
wherein
one of the first and second screw connection bodies comprises a free-wheel mechanism connected thereto,
a releasable coupling arrangement is provided between the free-wheel mechanism and the other one of the first and second screw connection bodies,
the releasable coupling arrangement connects the free-wheel mechanism and the other one of the first and second screw connection bodies in a mutually non-rotatable manner when the coupling arrangement is in a blocked state and disconnects the free-wheel mechanism from the other one of the first and second screw connection bodies when the coupling arrangement is in a released state,
the free-wheel mechanism is provided in such a manner that the screw connection bodies are rotatable in a direction of rotation (F) corresponding to the tightening of the screwed connection, when the coupling arrangement is in the blocked state,
in the blocked state of the coupling arrangement the free-wheel mechanism blocks relative movement of the first and second screw connection bodies in a direction of rotation (L) corresponding to a loosening of the screwed connection, and in the released state of the coupling arrangement relative movement in the direction of rotation (L) corresponding to a loosening of the screwed connection is allowed, wherein the coupling arrangement comprises first coupling means and second coupling means, the first coupling means and the second coupling means are formed in such a manner that they automatically engage with each other when tightening the screw connection bodies and create a mutually non-rotatable connection between the second screw connection body and the driver member, and an uncoupling device is provided in order to uncouple the coupling means from each other for the purposes of loosening the screwed connection.

8. A screw-nut assembly in accordance with claim 7, wherein the free-wheel mechanism carries said first coupling means which interact with said second coupling means on the driver member and which are adapted to rotate in the direction of rotation (F) corresponding to the tightening of the screwed connection.

9. A screw-nut assembly in accordance with claim 7, wherein the second screw connection body carries said first coupling means which interact with said second coupling means on the driver member.

10. A screw-nut assembly in accordance with claim 7, wherein the first coupling means or the second coupling means are formed by studs and wherein the counter-coupling means are formed by associated stud seatings.

11. A screw-nut assembly in accordance with claim 10, wherein the respective longitudinal axes of the studs and the stud seatings extend in parallel with the axial direction.

12. A screw-nut assembly in accordance with claim 11, wherein the stud seatings are formed in an end face of the driver member and wherein the studs project out from a corresponding radial surface of the second screw connection body.

13. A screw-nut assembly in accordance with claim 11, wherein the stud seatings are formed in a radial surface of the second screw connection body and wherein the studs project out from the end face of the driver member.

14. A screw-nut assembly in accordance with claim 11, wherein the studs and the stud seatings are arranged in the form of a circle, mutually adjacent stud seatings overlap so that the stud seatings are connected together in the manner of an annular groove, and the free ends of the respective studs are tapered.

15. A screw-nut assembly including an integrated, immediately effective securing arrangement for preventing unintentional loosening of a screwed connection formed thereby, comprising a first screw connection body and an associated second screw connection body, wherein one of the first and second screw connection bodies comprises a free-wheel mechanism connected thereto, a releasable coupling arrangement is provided between the free-wheel mechanism and the other one of the first and second screw connection bodies, the releasable coupling arrangement connects the free-wheel mechanism and the other one of the first and second screw connection bodies in a mutually non-rotatable manner when the coupling arrangement is in a blocked state and disconnects the free-wheel mechanism from the other one of the first and second screw connection bodies when the coupling arrangement is in a released state, the free-wheel mechanism is provided in such a manner that the screw connection bodies are rotatable in a direction of rotation (F) corresponding to the tightening of the screwed connection, when the coupling arrangement is in the blocked state, in the blocked state of the coupling arrangement the free-wheel mechanism blocks relative movement of the first and second screw connection bodies in a direction of rotation (L) corresponding to a loosening of the screwed connection, and in the released state of the coupling arrangement relative movement in the direction of rotation (L) corresponding to a loosening of the screwed connection is allowed, wherein the first and the second screw connection bodies each comprise a respective axial boring, the free-wheel mechanism is arranged in the axial boring of the first or second screw connection body, and a driver member is inserted into the axial boring of the first screw connection body.

16. A screw-nut assembly including an integrated, immediately effective securing arrangement for preventing unintentional loosening of a screwed connection formed thereby, comprising a first screw connection body and an associated second screw connection body, wherein one of the first and second screw connection bodies comprises a free-wheel mechanism connected thereto, a releasable coupling arrangement is provided between the free-wheel mechanism and the other one of the first and second screw connection bodies, the releasable coupling arrangement connects the free-wheel mechanism and the other one of the first and second screw connection bodies in a mutually non-rotatable manner when the coupling arrangement is in a blocked state and disconnects the free-wheel mechanism from the other one of the first and second screw connection bodies when the coupling arrangement is in a released state, the free-wheel mechanism is provided in such a manner that the screw connection bodies are rotatable in a direction of rotation (F) corresponding to the tightening of the screwed connection, when the coupling arrangement is in the blocked state, in the blocked state of the coupling arrangement the free-wheel mechanism blocks relative movement of the first and second screw connection bodies in a direction of rotation (L) corresponding to a loosening of the screwed connection, and in the released state of the coupling arrangement relative movement in the direction of rotation (L) corresponding to a loosening of the screwed connection is allowed, wherein the free-wheel mechanism comprises a cage containing rollers which interact with blocking ramp surfaces placed radially outwardly with respect to the rollers.

* * * * *